No. 893,495.

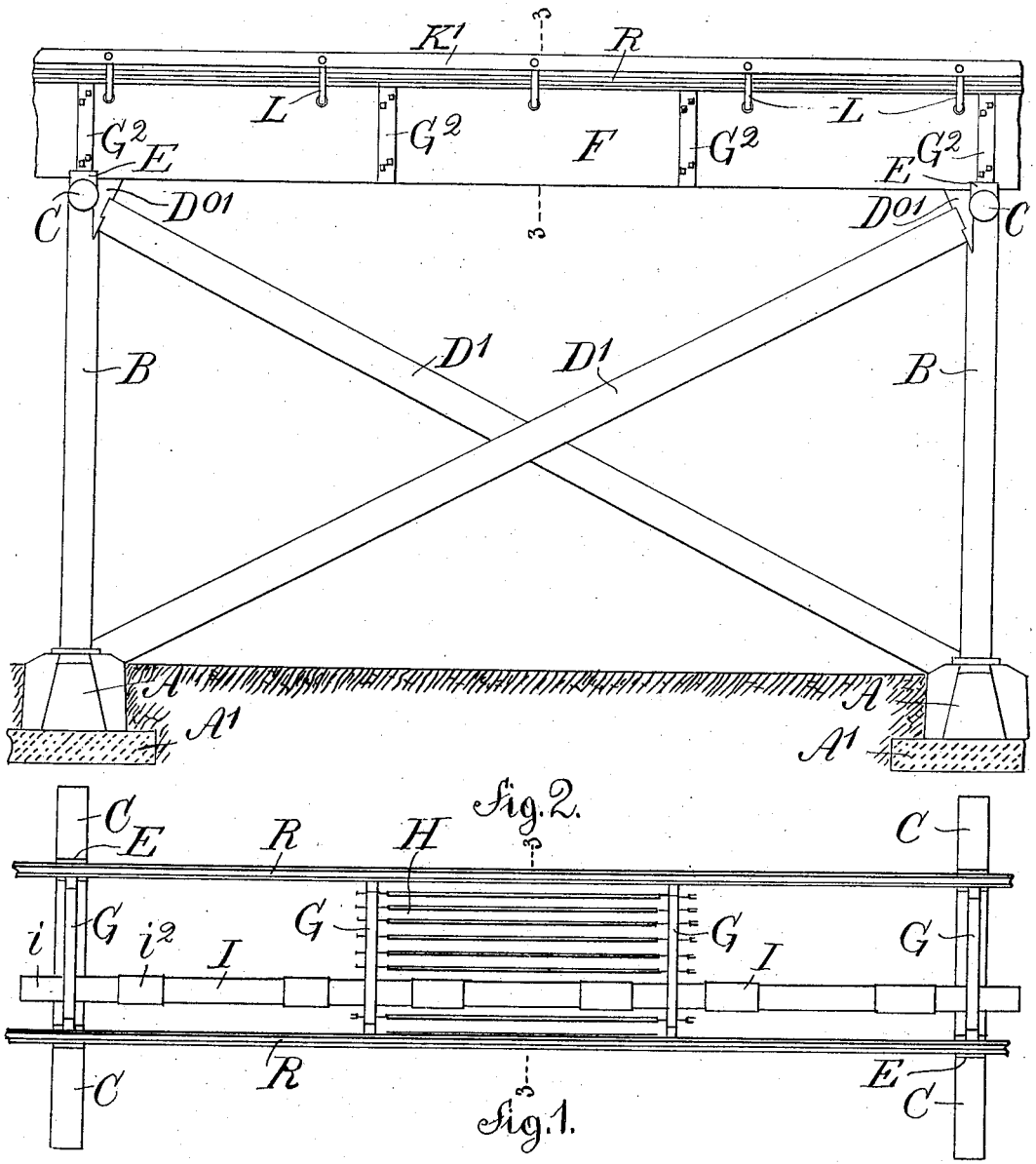

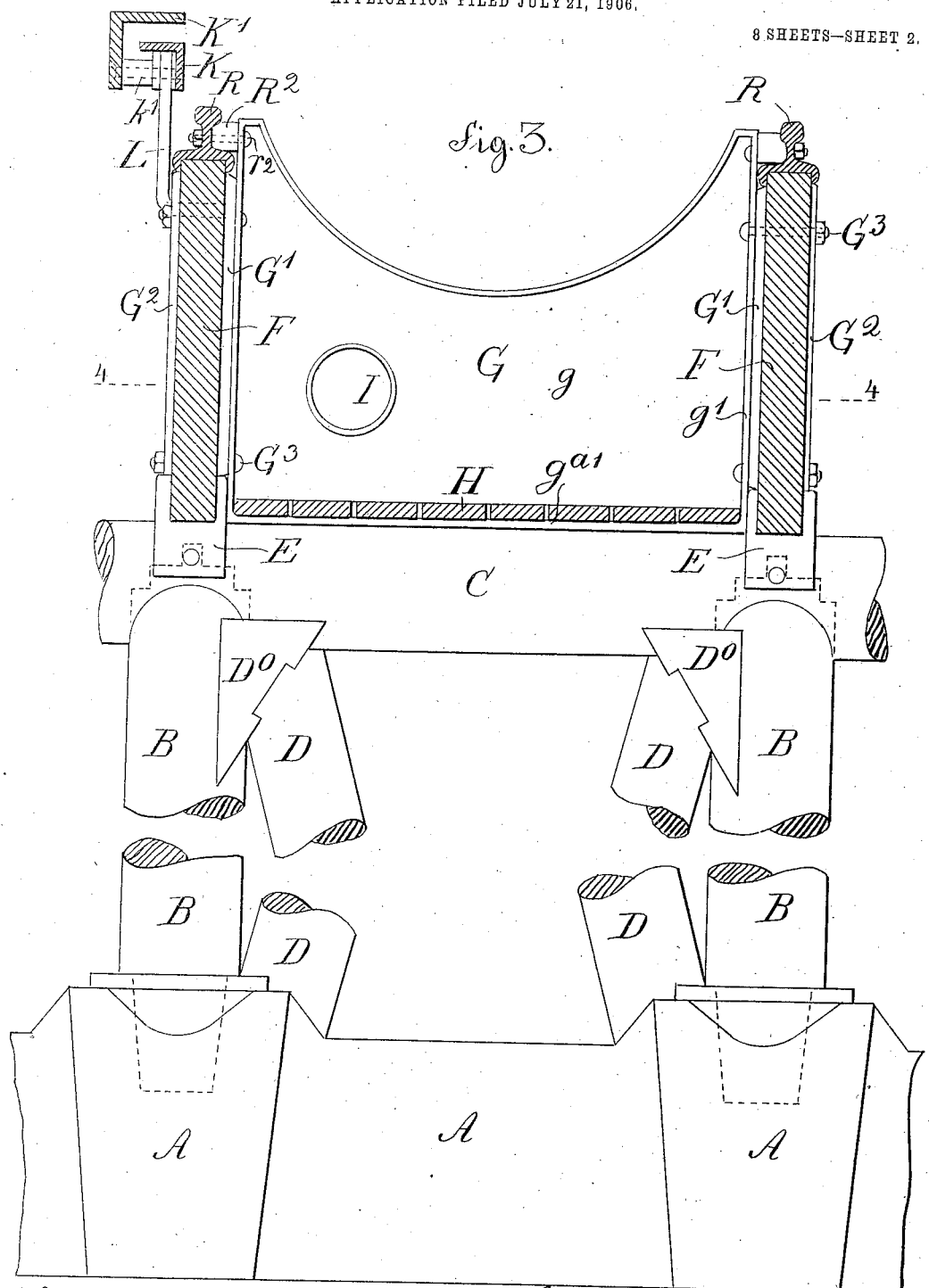

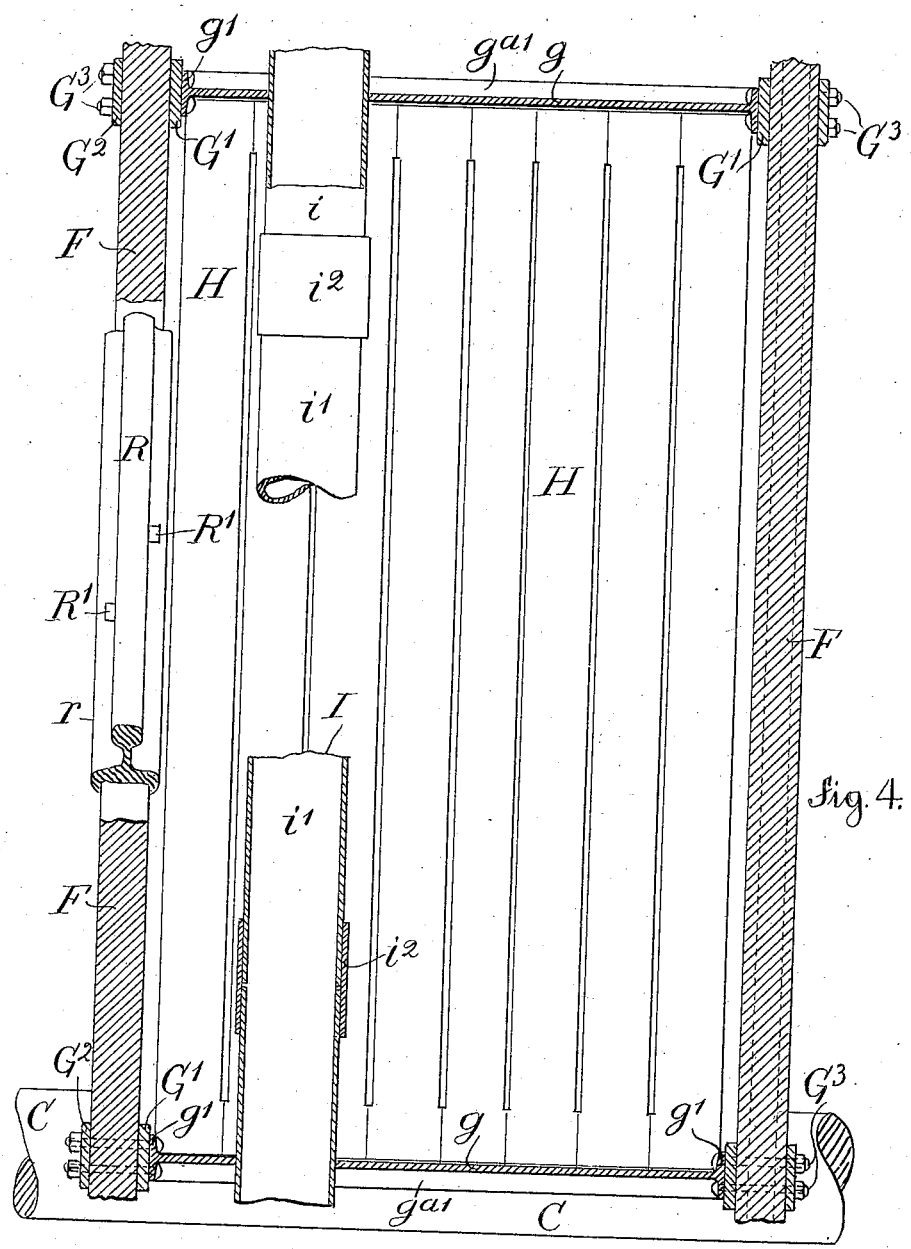

PATENTED JULY 14, 1908.

C. T. HARVEY.
ELEVATED RAILWAY CONSTRUCTION.
APPLICATION FILED JULY 21, 1906.

6 SHEETS—SHEET 4.

Witnesses:
A. M. Tanner
Edward N. Santon

Charles T. Harvey
Inventor
by Spear, Middleton, Donaldson & Spear
his Attorneys

Witnesses:
A. M. Tanner
Edward N. Sarton

Charles T. Harvey
Inventor
by Spear, Middleton, Donaldson & Spear
his Attorneys

No. 893,495.

PATENTED JULY 14, 1908.

C. T. HARVEY.
ELEVATED RAILWAY CONSTRUCTION.
APPLICATION FILED JULY 21, 1906.

8 SHEETS—SHEET 6.

No. 893,495. PATENTED JULY 14, 1908.
C. T. HARVEY.
ELEVATED RAILWAY CONSTRUCTION.
APPLICATION FILED JULY 21, 1906.

8 SHEETS—SHEET 7.

Witnesses:
A. M. Tanner.
Edward N. Sarton

Charles T. Harvey
Inventor
by Spear, Middleton, Donaldson & Spear
his Attorneys

No. 893,495.

PATENTED JULY 14, 1908.

C. T. HARVEY.
ELEVATED RAILWAY CONSTRUCTION.
APPLICATION FILED JULY 21, 1906.

8 SHEETS—SHEET 8.

Witnesses:
A. M. Tanner
Edward N. Saxton

Charles T. Harvey
Inventor
by Spear, Middleton, Donaldson & Spear,
his Attorney

UNITED STATES PATENT OFFICE.

CHARLES T. HARVEY, OF TORONTO, ONTARIO, CANADA.

ELEVATED-RAILWAY CONSTRUCTION.

No. 893,495.

Specification of Letters Patent.

Patented July 14, 1908.

Application filed July 21, 1906. Serial No. 327,247.

*To all whom it may concern:*

Be it known that I, CHARLES T. HARVEY, citizen of the United States, residing at Toronto, Canada, have invented certain new and useful Improvements in Elevated-Railway Construction, of which the following is a specification.

My invention, which will be hereinafter set forth and claimed, relates to the construction of elevated railways.

The object of my invention is to provide a system of elevated railway construction which, while of a durable nature, has the merit of being inexpensive and largely requiring only such materials as are readily obtainable and expeditiously erected—consisting principally of wood and cement, although not dispensing with metals.

To this end, my invention consists largely of devices for expeditious connections and weather-proof shapes and joints.

Figures 5, 6:
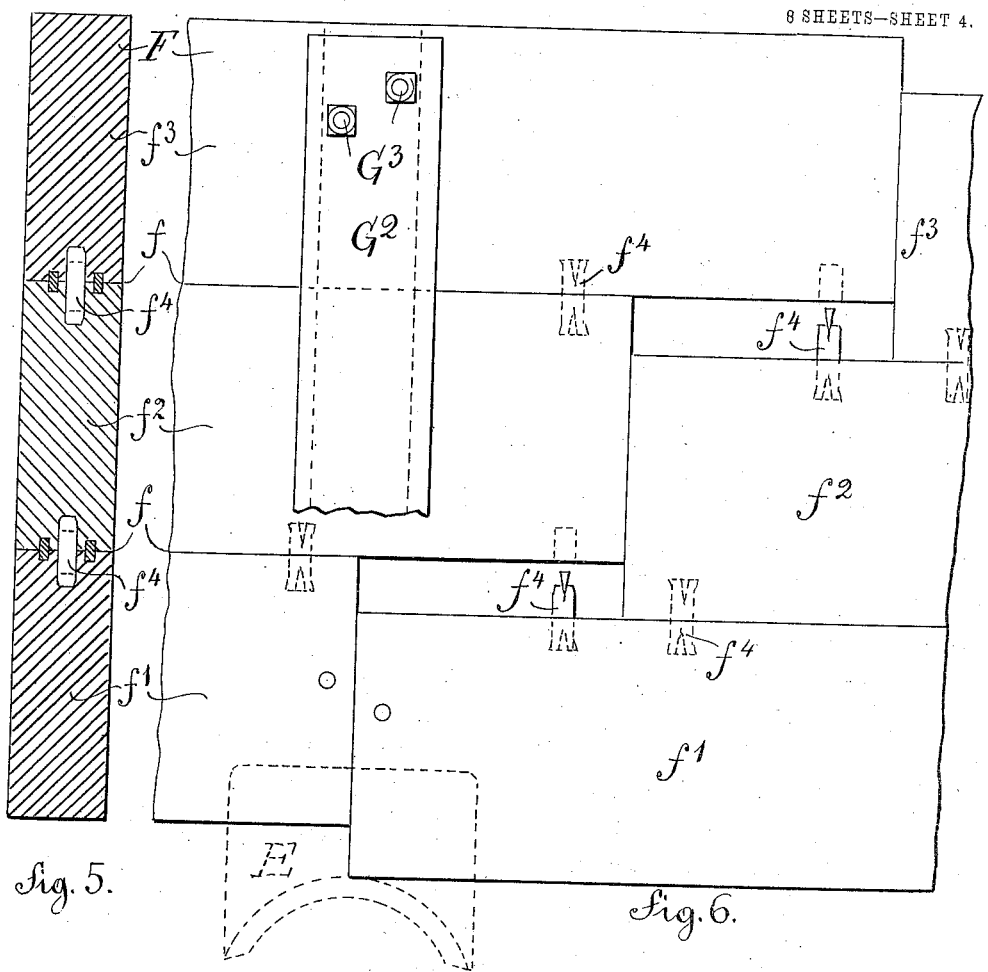
Figure 7:
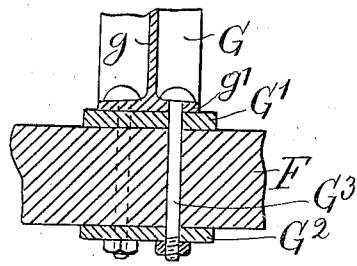
Figure 8:
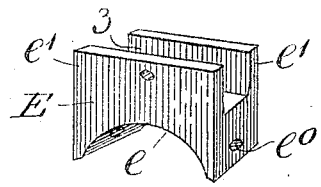
Figure 10:
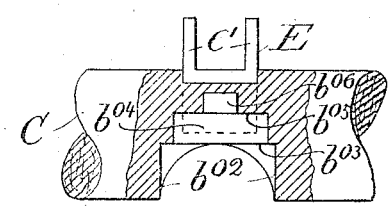
Figure 9:
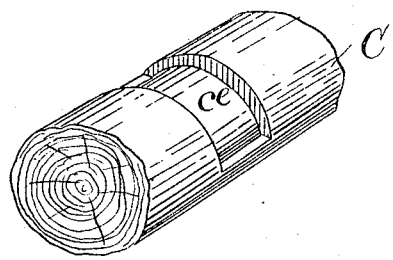
Figure 12:
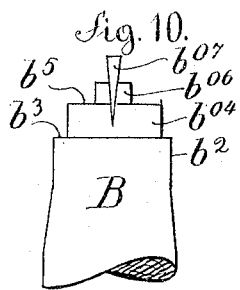
Figure 11:
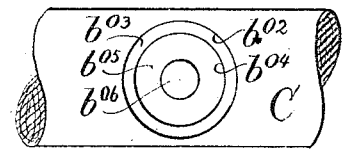
Figure 14:
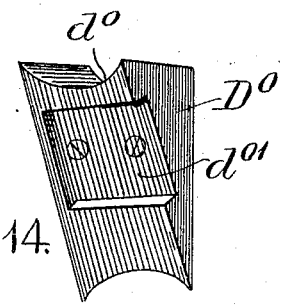
Figure 13:
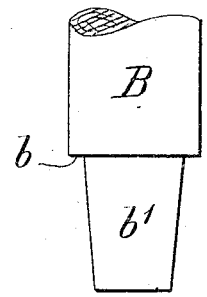
Figure 15:
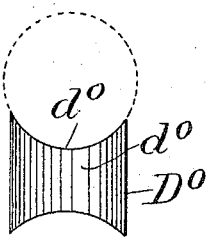
Figure 18:
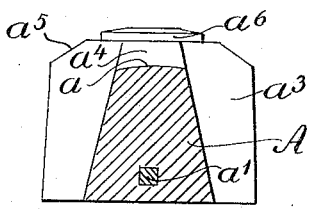
Figures 19, 20:
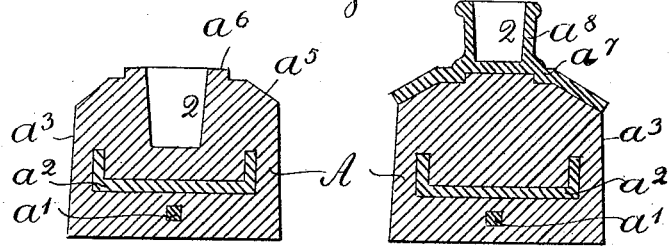
Figure 17:
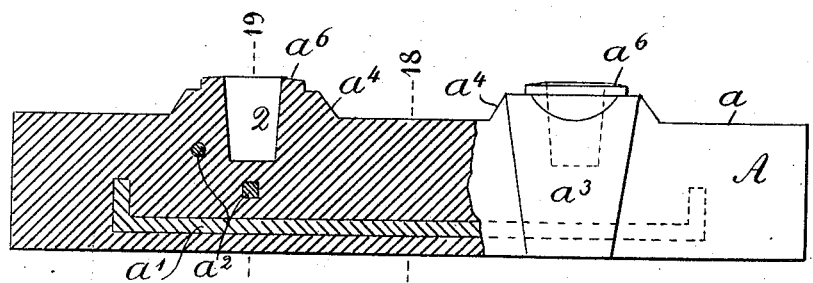
Figure 16:
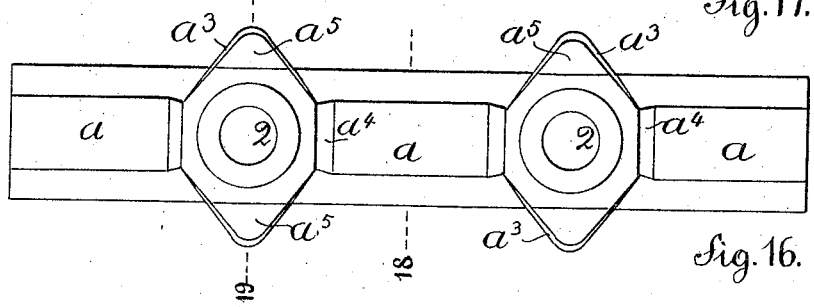
Figures 21, 22:
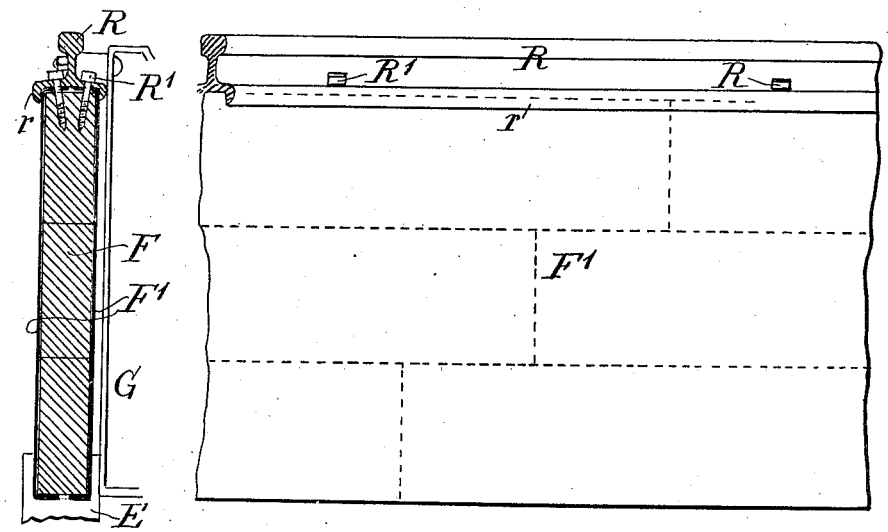
Figures 23, 24:
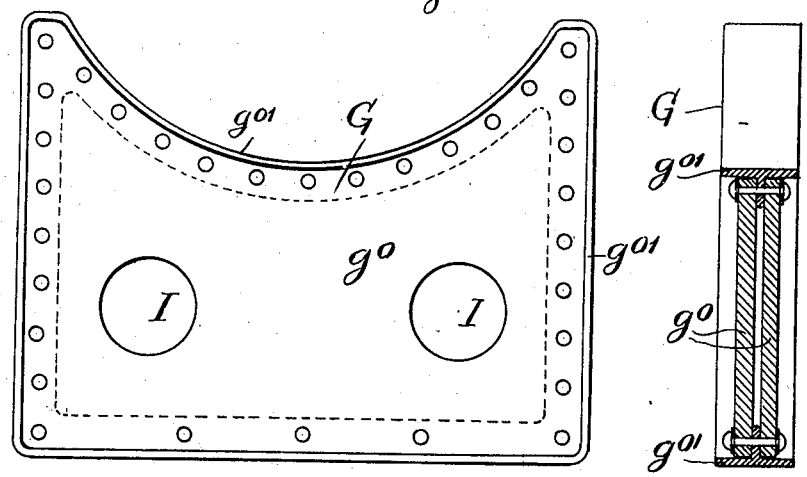
Figure 26:
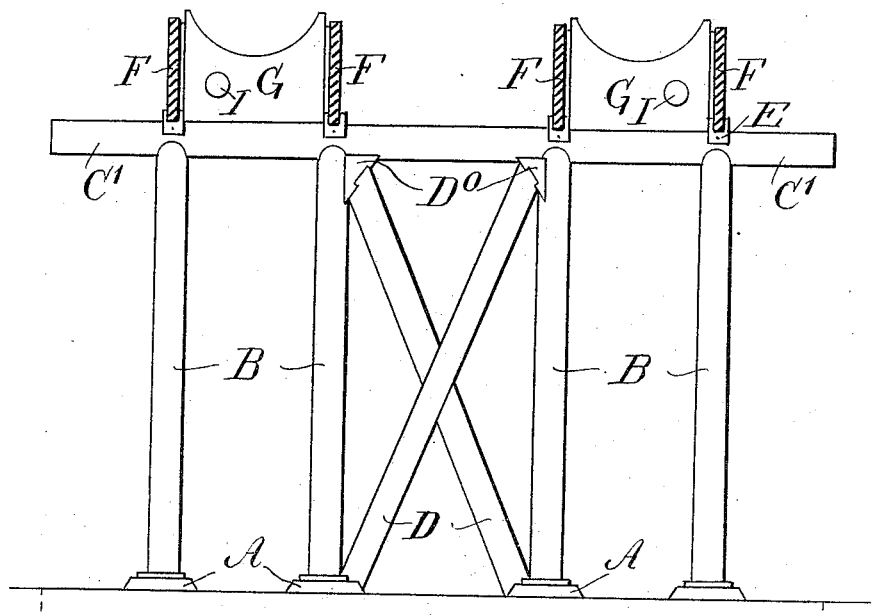
Figure 25:
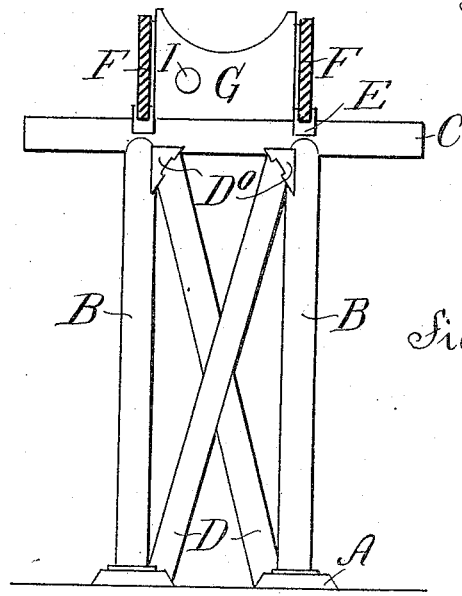

Figure 1 is a plan view of part of a line of an elevated railway, constructed according to my invention, some parts and small details being omitted. Fig. 2 is a side elevation of the same. Fig. 3 is a transverse section of the same on line 3—3, Figs. 1 and 2, on a larger scale, parts broken out. Fig. 4 is a horizontal longitudinal section, on line 4—4, Fig. 3. Figs. 5 and 6 are a transverse section and side view respectively, of one of the girders on a large scale, showing the construction of the same and a longitudinal joint, the two ends apart. Fig. 7 shows the connection of the tie with the girder. Fig. 8 is a perspective view of the saddle or girder chair. Fig. 9 shows the seat for the saddle or girder chair on the cap. Fig. 10 is a longitudinal vertical section of part of a cap, showing the saddle and mortise for post. Fig. 11 is a bottom view of the cap showing the mortise and corresponding to Fig. 10. Fig. 12 shows the tenon at the post. Fig. 13 shows the tenon at the bottom of the post.
Figs. 14 and 15 are a perspective view of the bracket at the top of the post receiving the cross brace and a top view of the same respectively. Figs. 16, 17, 18 and 19 are plan, longitudinal and two cross sections respectively, of the concrete base, the latter on lines 18—18, and 19—19, Figs. 16 and 17 respectively. Fig. 20 is a modified construction corresponding to Fig. 19. Figs. 21 and 22 show a girder in cross section and elevation respectively, covered with sheet metal. Figs. 23 and 24 are elevation and cross section respectively of a modified construction of a tie. Fig. 25 is a cross section of a single track line on a small scale, showing one of the bents in elevation, and Fig. 26 is a cross section of a double track line, showing a bent in elevation.

Along the line of the projected elevated railway are placed, at certain intervals apart—say twenty-five to forty feet—transversely, blocks of molded and reinforced concrete A, upon a broader footing, $A^1$, of flags or concrete. The position of the concrete base is shown in Figs. 2, 3, 25 and 26 and its construction in Figs. 16, 17, 18 and 19. It consists of a trapezoidal body, the upper narrow surface, $a$, of which is to be approximately level with the ground surface and in which are embedded longitudinal and transverse reinforcing bars, $a^1$ and $a^2$, respectively. The parts $a^3$ which are to receive and bear the posts are widened out and made higher, the rises being formed with beveled faces, $a^4$ $a^5$, to receive the lower ends of the braces and with an upper facing $a^6$, and with a conical socket, 2, to receive the post. The socket may be covered with a metallic top, $a^7$, if desired, in which the socket, $a^8$, may be formed, as shown in Fig. 20. Care will be taken that all the top surfaces are formed with a slight bevel to shed the water readily. Upon the base thus formed are erected bents, formed preferably of round timber, consisting of posts B, cap-beams C and braces D, as shown in Figs. 1, 3, 25 and 26. The lower end of the post, Fig. 13 is formed with a large conical tenon, $b^1$, setting off with a shoulder $b$ which sits upon the facing, $a^6$, while the tenon fits tight into the socket 2. The upper round end, $b^2$, Fig. 12, enters the cap bodily to about half its depth, then sets off with a shoulder, $b^3$, to a short cylindrical part, $b^4$, and terminates with a shoulder $b^5$ and pin, $b^6$, which is split for the insertion of a wedge $b^7$;
the latter being driven home by the coming together of the joint. To receive this tenon the cap, C, Figs. 10 and 11, has a cylindrical bore $b^{02}$ sunk in it, of the same diameter as the upper end $b^2$, of the post, an offset being then made by a flat surface $b^{03}$ to a deeper cylindrical bore $b^{04}$ corresponding to the part $b^4$ and terminating in a flat surface $b^{05}$ and a pin hole $b^{06}$. It will be observed that this joint is to some extent self-locking by means of the wedge $b^7$ and that all the end wood of the post is received into the recesses in the cap and the post is thus protected against the soaking up of moisture by the end wood. Cross braces, D, D, are placed in each single or double bent, as shown in Figs. 3, 25 and 26, the lower ends being shaped and footed upon the beveled faces $a^4$ of the base and the upper notched into brackets, $D^0$, placed in the upper angles between the post and cap and secured to the former as shown in detail in Figs. 14 and 15. These brackets are formed with concave backs $d^0$, to fit the round timber of the post and cap and are formed with shouldered recesses $d^{01}$, to receive the brace. In the case of double bents as shown in Fig. 26, the cross braces are placed between the two inner posts, the cap $C^1$, being double the length of the single track cap; but except in this extra length of the base and cap and extra posts, the construction is identical with that of the single track line. Cross braces $D^1$, Fig. 2, are also placed longitudinally between alternate bents or farther apart as may be thought desirable. They are footed similarly to the brace D and notched into brackets, $D^{01}$, somewhat similar to the brackets $D^0$, at the upper ends of the posts.

Upon the cap and over each post is placed a saddle or chair, E, let into the former and adapted to receive the lower edge of the girder, as shown in detail in Figs. 8, 9 and 10 and generally in Figs. 1, 2, 3, 4, 25 and 26. It is formed with a concave seat $e$, to conform to the round top of the timber cap and two longitudinal flanges, $e^1$, forming a groove, 3, between them for the reception of the girder. A bed, $c^e$, is formed in the top of the cap for its reception and to give it a firm seat, so that it cannot yield laterally and is secured with screws through holes $c^0$.

F F are continuous girders upon which the rails, R, are carried. These girders are shown in detail in Figs. 5 and 6 and generally in Figs. 1, 2, 3, 4, 25 and 26. They are of wood and of "the built-up" description; the examples in Figs. 5 and 6 showing them composed of three planks, $f^1 f^2 f^3$, put together with groove-and tongue joints, $f$, and split and wedged dowels, $f^4$, the latter inserted at intervals. Glue or other cement may or may not be used in putting together these joints. Longitudinal joints may be made in offsets, as shown in Fig. 6, or in any other desirable manner. Figs. 21 and 22 show the same construction of girder, but in these figures the surfaces are covered with sheet metal, $F^1$, as a protection against weather and other adverse influences. The sheet metal covering $F^1$ is bent around the edges and at the top the edges of the sheeting are covered by the rail foot and flanges. The girder is supported in the saddle or chair E and held by it and prevented from shifting laterally. The two girders are connected at intervals by ties, G, as shown in Figs. 1, 7, 25 and 26, and more in detail in Figs. 3 and 4. It consists of a sheet metal web, $g$, rimmed by a flange, $g^1$, the top being preferably formed with a deep curve, so that the center is considerably lower than the ends, which latter rise to the head of the rail. A filling strip, $G^1$, Figs. 3 and 4, is inserted between the end flanges and the girder, to make up for the overhanging flange of the rail foot and the end flanges are bolted to the girder and through the filling strip and through a continuous vertical plate washer, $G^2$, with bolts, $G^3$, as shown in detail in Fig. 7 and also seen in Figs. 2, 3, 4 and 6. The bottom flange $g^{a1}$ is made strong so as to carry the flooring H as shown in Figs. 1, 3 and 4. The web $g$ may be perforated with one or more larger openings for the insertion and carrying a line of conduit pipes, I, Figs. 1, 3, 4, 25 and 26. These may be constructed in any desired manner, or as shown in the illustration with trunks, $i$, resting in the web insertions $i^1$ and telescopic couplings, $i^2$.

In Figs. 23 and 24 is shown a modified construction of the tie, being a composite one and consisting of a welded metallic flange, $g^{01}$, formed of T iron or steel, with two skins, $g^0$, of boards or planks riveted to the web, to form the web of the tie.

The top of the girder carries the rail R. This is formed with a broad foot with overhanging depending flanges $r$, covering the edges of the girder, as shown in Figs. 3, 4 and 21. It is secured to the girder by screws, $R^1$, as shown in Figs. 3, 4 and 21. The flange $g^i$ of the tie is extended upward to the head, a block, $R^2$, is inserted between the latter and the rail web and a bolt, $r^2$, passed through flange, block and web, as shown in Fig. 3.

To adapt the road to electric motive power, an electric conductor, K, in the form of a continuous angle bar may be secured above and just outside the rail, as shown in Figs. 2 and 3. This may be carried on brackets, L, bolted to the girder and fitting in a socket, $k$ provided by a bracket on the conductor rail. A protecting covering, $K^1$, may be carried on the outside, bolted to an insulating tube, $k^1$.

The above description applies generally to a single track line. If a double track line is to be constructed, the concrete blocks A are made double the length and provision made for four posts carrying a double length cap piece $C^1$, as shown in Fig. 26, thus forming a double bent with the braces in the center.

While round timbers are preferred for the construction of the bents, on account of its natural facility to throw off moisture and prevent it lodging and soaking into the fiber, it is not absolutely essential. Square or polygonally shaped cross sections might be used and the ordinary methods of framing adopted for the former. The base, socket and tenon is equally adapted to a square post. With different cross-sections of timber, the saddles and brackets require to be adapted to the particular shape.

I claim as my invention:

1. In an elevated railway and in combination transverse bases of molded reinforced concrete containing sockets for posts, timber bents consisting of a pair of posts socketed in said bases and of cap beams and cross braces, metallic saddles secured upon said caps, built-up plank girders set in the said saddles, flanged plate ties bolted through the flanges to said girders at intervals, flooring supported on the bottom flanges of said ties and flange-footed rails supported upon and overlapping the upper edges of the girders and secured in place substantially as set forth.

2. In an elevated railway and in combination, molded foundations of reinforced concrete placed transversely to the line to form the bases of the bents and containing sockets for posts, bents of timber consisting of posts, cap beams and cross braces, the posts socketed into the bases, longitudinal cross braces between pairs of bents at intervals, saddles secured to the caps adapted to receive the girders, built-up wooden girders placed in said saddles, flanged plate ties bolted to the girders at intervals, flooring carried on the bottom flanges of said ties, flange-footed rails carried on the upper edge of the girders and secured thereto and conduits carried by the webs of the ties, substantially as set forth.

3. In an elevated railway and in combination molded reinforced concrete foundations placed transversely to the line to form the bases of the bents and containing sockets for the posts, bents of timber consisting of posts, cap-beams and cross braces, the posts socketed into the bases, longitudinal cross braces between pairs of bents at intervals, saddles secured to the caps adapted to receive the girders, built-up wooden girders placed in said saddles, flanged plate ties bolted to the girders at intervals, flange-footed rails carried on the upper edges of the girders and secured thereto, a series of brackets, bolted to the girders near the upper edge and an electrical conductor rail carried on said brackets, substantially as set forth.

4. In an elevated railway, the combination of a series of transverse foundations consisting of molded and reinforced concrete bases, a bent of timber on each foundation, longitudinal cross braces between pairs of bents at intervals, built-up timber girders supported on the caps of the bents, flanged plate ties connecting said girders at intervals, flange-footed rails secured to the girders, flooring carried on the bottom flanges of the ties, conduits carried in the webs of the ties and an electric conductor carried on brackets secured to the girder, substantially as set forth.

5. In an elevated railway, the combination with a timber cap beam and a wooden girder set on edge, a metallic saddle bedded upon and checked into said cap and provided with a pair of flanges forming a groove for the reception of the girder bottom, substantially as set forth.

6. In an elevated railway, the combination with a round timber cap beam, and a wooden girder set on edge, a metallic saddle having a concaved seat fitting the shape of the cap timber and checked into a recess therein and a pair of flanges forming the longitudinal groove for the reception of the girder bottom.

7. In an elevated railway, the combination with a molded reinforced concrete base formed with conical sockets and beveled off-set faces, timber posts having conical tenons fitting said sockets and being round at the upper part, a round cap beam joined to said posts by receiving the off-set round tenons of the round upper parts of the posts, brackets having concaved backs secured to the posts in the cap angles and a pair of cross braces footing on the beveled off-sets of the base and into the said brackets at the upper end, substantially as set forth.

8. In an elevated railway, the combination with a round timber post and cap beam connected substantially at a right angle, of a metallic bracket having its back concaved to fit against post and cap and adapted to be secured to said post and having its face recessed to receive the shaped end of a brace, substantially as set forth.

9. In a molded concrete foundation for an elevated railway, the combination of a block having tapering sides and beveled-off tops, of reinforcing bars, embedded longitudinally and transversely and having enlargements extending laterally and upwardly with beveled off-sets to receive the ends of the timber braces and formed with a central tapering socket for the reception of a timber post, substantially as set forth.

10. The combination of a molded reinforced concrete block having enlargements containing conical sockets, timber posts having tenons received and fitting in said sockets, a cap beam connected to the top of said posts by bore holes sunk therein and receiving the off-set round tenons of the round upper part of the posts, brackets secured to the posts in the inner angles of the posts and cap and cross braces received in said brackets at the top and setting upon the beveled off-sets of the concrete base, substantially as set forth.

11. In a girder for an elevated railway, the combination of a series of planks connected edge to edge, said edges being grooved and tongued and a series of dowels in said edges having their ends split and wedges inserted which are driven in as the joint closes up, substantially as set forth.

12. The combination with a pair of wooden girders set on edge, a series of flanged plate ties connecting said girders transversely, a filling strip between each end flange and girder, a vertical continuous plate washer on the outside of said girders and bolts passing through the flanges of the ties, filling strips, girders and washer plates, substantially as set forth.

13. The combination with a pair of wooden girders set on edge, of a series of flanged plate ties bolted to said girders at intervals and a rail on each girder having a flanged foot overlapping the edges of said girder and screws securing said rail to said girders, substantially as set forth.

14. The combination with a pair of wooden girders set on edge, of a series of flanged plate ties bolted to said girders at intervals, a rail secured to the top of each girder and flooring carried on the bottom flanges of the ties, substantially as set forth.

15. The combination with a pair of wooden girders set on edge, of a series of flanged plate ties bolted to said girders at intervals, a rail secured to the top of each girder and a conduit carried by the web of said ties, substantially as set forth.

16. The combination in an elevated railway of a wooden girder set on edge, a rail secured to the top thereof, a series of brackets secured at the side to the upper part of the girder and extending upwardly alongside the rail and provided with sockets, and an electric conductor K in the form of an angle iron overhanging said sockets and carried by said brackets, substantially as set forth.

17. The combination with a wooden girder set on edge, a metallic sheet covering overlapping the top and bottom edges and a rail with a flanged foot overlapping the edges of said covered girder, substantially as set forth.

18. In combination, in an elevated railway, a series of transverse reinforced molded concrete foundations having sockets in their ends, a series of posts set in pairs therein, each pair connected by cross beams at the top, and wooden girders with metal flanged plate ties connecting said girders and flanged rails also on said girders, substantially as described.

In testimony whereof, I affix my signature in presence of two witnesses.

CHARLES T. HARVEY.

Witnesses:
HENRY E. COOPER,
EDWARD N. SARTON.